United States Patent [19]

Shono

[11] 3,918,076

[45] Nov. 4, 1975

[54] LIGHT SHIELD ARRANGEMENT FOR AN EYEPIECE SYSTEM OF A SINGLE LENS REFLEX CAMERA HAVING AN ELECTRONIC SHUTTER

[75] Inventor: Tetsuji Shono, Ranzon, Japan

[73] Assignee: Asahi Kogaku Kohyo Kabushiki Kaisha, Tokyo, Japan

[22] Filed: Sept. 9, 1974

[21] Appl. No.: 504,555

Related U.S. Application Data

[63] Continuation of Ser. No. 369,532, June 13, 1973, abandoned.

[30] Foreign Application Priority Data

June 19, 1972 Japan................................ 47-71350

[52] U.S. Cl................................. 354/219; 354/224
[51] Int. Cl. ........................................... G03b 13/02
[58] Field of Search ............ 354/219, 224, 225, 154

[56] References Cited
UNITED STATES PATENTS

| | | |
|---|---|---|
| 3,008,397 | 11/1961 | Winkler .............................. 354/136 |
| 3,613,543 | 10/1971 | Mita et al. ........................... 354/154 |
| 3,643,573 | 2/1972 | Heruma ................................ 354/23 |
| 3,706,268 | 12/1972 | Engelsmann .................... 354/147 X |
| 3,783,765 | 1/1974 | Uno et al. ........................... 354/219 |
| 3,821,768 | 6/1974 | Urano et al. ........................ 354/219 |

Primary Examiner—Samuel S. Matthews
Assistant Examiner—E. M. O'Connor
Attorney, Agent, or Firm—Marn & Jangarathis

[57] ABSTRACT

An eyepiece assembly including a light shield member is disclosed for a single lens reflex cameras having an electronic shutter including a shutter knob having a dial which can effect a "manual-auto" change-over wherein the light shield member for the eyepiece assembly is interconnected with the shutter knob in a manner such that the shield member is opened when the shutter dial is set to a "manual shutter" position and is either opened or closed when the shutter dial is set to an "auto shutter" position whereby in such closed position light is substantially prevented from entering the camera through the eyepiece assembly.

6 Claims, 4 Drawing Figures

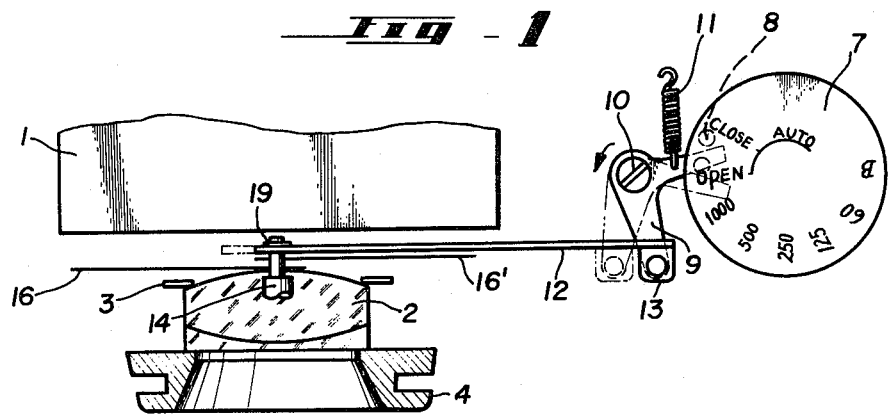
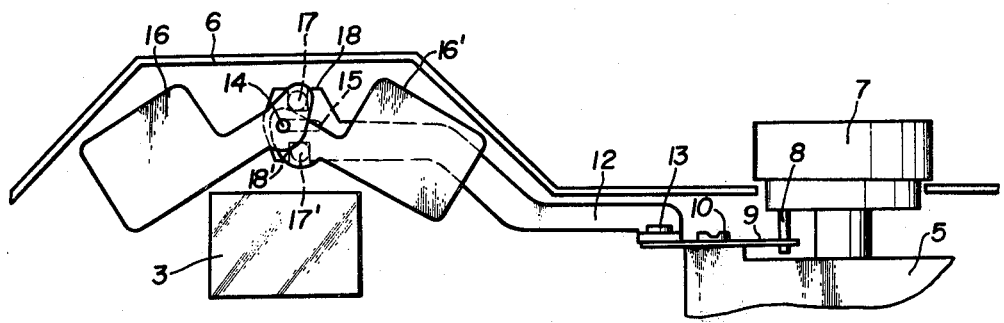
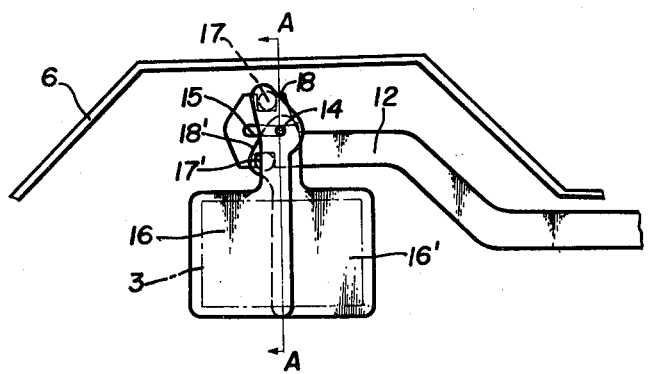 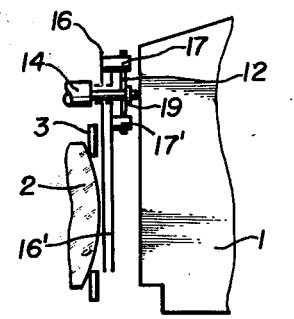

LIGHT SHIELD ARRANGEMENT FOR AN EYEPIECE SYSTEM OF A SINGLE LENS REFLEX CAMERA HAVING AN ELECTRONIC SHUTTER

This is a continuation, of application Ser. No. 369,532, filed June 13, 1973, now abandoned.

BACKGROUND OF THE INVENTION

This invention relates to single lens reflex cameras, and more particularly to an eyepiece assembly for single lens reflex camera having an electronic shutter.

In a single lens reflex camera having an electronic shutter which automatically controls shutter speed in accordance with the amount of light reflected from an object to be photographed, in normal photographic operation, such as one made with the camera held by the hands of the user, the amount of light entering the camera through the eyepiece of the viewfinder is very small so that it is hardly necessary to consider its undesirable influence upon proper exposure. However, in photographic operations not employing the viewfinder eyepiece, such as upon automatic photographing operations with a self-timer, motor drive or upon microscopic photographing operations, the amount of light entering through the eyepiece can not be neglected. Under these circumstances there have been means, such as attaching a cap to the viewfinder eyepiece or by providing the camera with a lever for operating an eyepiece shield member. The former means requires troublesome operations with possible loss of the cap, while the latter means results in higher cost and further causes undesirable esthetic appearance of the camera.

OBJECTS OF THE INVENTION

It is an object of the present invention to provide a novel eyepiece assembly for a single lens reflex camera.

Another object of the present invention is to provide a novel eyepiece assembly for a single lens reflex camera wherein the assembly is operatively associated with a shutter knob having a dial therefor.

SUMMARY OF THE INVENTION

These and other objects of this invention are achieved by a novel eyepiece assembly for a single lens reflex camera having an electronic shutter including a shutter knob having a dial which is provided with a "manual-auto" change-over setting wherein the eyepiece assembly includes a light shield member in operative relationship with the shutter knob in a manner such that the light shield member is opened when the shutter dial is set to a "manual shutter" position and is either opened or closed when said dial is set to "auto shutter" position whereby in such closed position light is substantially prevented from entering the camera through the eyepiece assembly.

BRIEF DESCRIPTION OF THE DRAWINGS

A better understanding of the present invention as well as other objects and advantages thereof will become apparent upon consideration of the detailed disclosure thereof, especially when taken with the accompanying drawings, wherein like numerals designate like parts throughout.

FIG. 1 is a partial top plan view of a single lens reflex camera illustrating the eyepiece assembly of the present invention, in an "open" configuration.

FIG. 2 is a partial elevational view thereof;

FIG. 3 is a partial elevational view of the eyepiece assembly of the present invention in a "closed" configuration; and FIG. 4 is a sectional view taken along the lines A—A of FIG. 3.

DETAILED DESCRIPTION OF INVENTION

Referring now to FIGS. 1 to 4, there is illustrated a penta prism 1, an eyepiece 2, a light shield member, generally indicated as 3, an eyepiece frame 4, a shutter control arrangement 5, a top cover 6 and a shutter knob having a dial 7 including a pin 8 affixed thereto. A coupling lever 9 is provided pivotally mounted to the shutter control arrangement 5 by a screw 10. A contraction spring 11 is positioned with one end portion thereof engaging the coupling lever 9 and the other end portion of fixed to a leg section of the shutter control arrangement 5 to permit the coupling lever 9 to pivot in the direction indicated by the arrow in FIG. 1. An open-close lever 12 is provided with one end portion supported by a pin 13 fixed to a leg section of the coupling lever 9 and having a slot 15 at the other end portion loosely engaging a shield blade supporting pin 14 mounted on the camera body (not shown). Shield blades 16 and 16' are swingably supported by the shield blade supporting pin 14 with open-close pins 17 and 17' symmetrically fixed to arm portions of the blades. The open-close pins 17 and 17' loosely engage recesses 18 and 18' formed in the open-close lever 12, respectively. A lock-washer 19 is secured to the shield blade supporting pin 14 so as to prevent the shield blades 16 and 16' and the open-close lever 12 from disengaging from the supporting pin 14.

The surface of the shutter knob has a dial divided into an "AUTO" range and an "B - 1/1000 second" range with the "AUTO" range being provided with "CLOSE" and "OPEN" indices. When the shutter dial 7 is set to a point within the manual shutter range "B, 60–1000," the pin 8 is separated from the coupling lever 9 due to the contraction resiliency of the spring 11. As a result, the open-close pins 17 and 17' of the respective shield blades 16 and 16' to be moved to the right causing the shield blades 16 and 16' to be in the "open" state. When the shutter dial 7 is set to the "AUTO-OPEN" position within the auto-shutter range, the pin 8 is also separated from the coupling lever 9 with the result that the shield blades 16 and 16' are similarly in the "open" state.

When the shutter dial 7 is set to the "AUTO-CLOSE" position within the auto-shutter range, the pin 8 is caused to engage the coupling lever 9 is a manner to pivot the lever 9 against the action of the spring 11 in the clockwise direction of FIG. 1 to the position shown by dot-dash lines. The open-close lever 12 is caused to move to the left (FIG. 1) with the result that the shield blades 16 and 16' are symmetrically downwardly swung into the "closed" state as shown in FIG. 3. When the shutter dial 7 is reset from the "AUTO-CLOSE" position to the "AUTO-OPEN" position or to manual shutter range, the pin 8 is disengaged from the coupling lever 9 by the resiliency of the spring 11 causing the coupling lever 9 to be pivotted counterclockwise as shown by the arrow in FIG. 1 thereby causing the open-close lever 12 to move to the right with the concomitant upwardly rotation of the shield blades 16 and 16' about the pins 17 and 17' to the "open" state.

Thus, in accordance with the present invention, a direct driving assembly to the shutter knob which can be readily built in conventional camera body is provided, so that it is not necessary to provide a special operating member on the camera, and accordingly, there is no esthetic influence on the camera's appearance.

It is readily apparent that the shield blade member may be positioned at any place between the viewfinder eyepiece frame to the light receiving element of the camera whereby the shield blade member can block the light path through the eyepiece system. Also, it is understood for attaining the object of the present invention, that the shield blade member need not be formed of two blades as hereinabove described, but one resembling focal plane shutter screen or a single metal plate in driving connection with the shutter dial.

What is claimed is:

1. In a single lens reflex camera having an electronic shutter including a knob for setting a shutter speed and, alternatively, for setting the shutter in its automatic setting range, a dial on said knob for indicating the shutter speeds and the automatic setting range, and a lens, an improved eyepiece assembly which comprises:
   an eyepiece;
   an eyepiece frame; and
   light shield means operatively interconnected to said knob, said light shield being movable between an opened condition and a closed condition wherein said light shield is disposed between said lens and said eyepiece, said knob having opened and closed positions when set in said automatic setting range, said opened and closed positions of said knob corresponding, respectively, to the opened and closed conditions of said light shield, said opened and closed positions of said knob being indicated on said dial.

2. The assembly as defined in claim 1 wherein said light shield means include blade means rotatably mounted to said camera.

3. The assembly as defined in claim 2 wherein said blade means is comprised of two blade members.

4. The assembly as defined in claim 3 and additionally comprising lever means having slot means and wherein said blade members proximate to the a pivot of rotation are provided with first pin means for engaging said slot means of said lever means.

5. The assembly as defined in claim 4 wherein said lever means is comprised of a first lever and a second lever, said first lever having said slot means at one end thereof and a hingedly affixed second pin means at the other end thereof, said second lever having two leg portions and being rotatably mounted to said camera for hingedly engaging said second pin means at one leg portion thereof.

6. The assembly as defined in claim 5 wherein said shutter dial is provided with an outwardly extending rod means for engaging the other leg portion of said second lever and wherein a spring is provded to bias said second lever when said rod means is disengaged from said second lever to permit light to pass through said eyepiece.

* * * * *